(12) United States Patent
Nagahara

(10) Patent No.: US 7,928,902 B2
(45) Date of Patent: Apr. 19, 2011

(54) POSITIONING METHOD, POSITIONING DEVICE, AND ELECTRONIC INSTRUMENT

(75) Inventor: Mikio Nagahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 385 days.

(21) Appl. No.: 12/255,219

(22) Filed: Oct. 21, 2008

(65) Prior Publication Data

US 2010/0045516 A1 Feb. 25, 2010

(30) Foreign Application Priority Data

Oct. 23, 2007 (JP) ................ 2007-274697

(51) Int. Cl.
*G01S 1/00* (2006.01)
*H04B 7/185* (2006.01)
*G01S 19/28* (2010.01)

(52) U.S. Cl. .............. 342/357.17; 342/357.67
(58) Field of Classification Search .......... 342/357.1, 342/357.67
See application file for complete search history.

(56) References Cited

U.S. PATENT DOCUMENTS

| 5,448,773 | A * | 9/1995 | McBurney et al. | 455/343.6 |
| 7,750,848 | B2 * | 7/2010 | Normark et al. | 342/357.25 |
| 2003/0016170 | A1 * | 1/2003 | Jandrell | 342/357.12 |
| 2009/0002234 | A1 * | 1/2009 | Normark et al. | 342/357.15 |

FOREIGN PATENT DOCUMENTS

| JP | 04127077 A | * | 4/1992 |
| JP | 2003-240836 A | | 8/2003 |

* cited by examiner

*Primary Examiner* — Thomas H Tarcza
*Assistant Examiner* — Frank McGue
(74) *Attorney, Agent, or Firm* — Global IP Counselors, LLP

(57) ABSTRACT

A positioning method that performs current position calculations and outputs a positioning result position includes searching for satellite signals transmitted from positioning satellites to acquire satellites, combining satellites among the acquired satellites to extract satellite sets used for positioning, performing first positioning calculations on each calculation-target satellite set among the extracted satellite sets using the satellite signals transmitted from the acquired satellites included in the calculation-target satellite set, performing second positioning calculations on each calculation-target satellite set among the extracted satellite sets using the satellite signals transmitted from the acquired satellites that are included in the calculation-target satellite set, but do not include a low-elevation-angle satellite, and determining whether or not a positioning result obtained using the calculation-target satellite set is appropriate based on the difference between a position calculated by the first positioning calculations and a position calculated by the second positioning calculations, the elevation angle of the low-elevation-angle satellite satisfying a given low elevation angle condition, and determining the positioning result position from the positions calculated by the first positioning calculations on the satellite sets for which the positioning result has been determined to be appropriate.

7 Claims, 12 Drawing Sheets

FIG. 11

| SATELLITE COMBINATION | ACQUIRED SATELLITE | NUMBER OF SATELLITES | MASTER LOCATED POSITION | APR VALUE | PDOP VALUE | EVALUATION POINT |
|---|---|---|---|---|---|---|
| B | S7, S8, S9, S24, S26, S29 | 6 | (XB,YB,ZB) | 62.9 | 1.9 | −15.00 |
| C | S7, S8, S9, S10, S24, S29 | 6 | (XC,YC,ZC) | 58.4 | 4.5 | −18.00 |
| D | S6, S8, S9, S24, S26, S29 | 6 | (XD,YD,ZD) | 23.1 | 3.1 | 20.00 |
| E | S8, S9, S21, S24, S26, S29 | 6 | (XE,YE,ZE) | 20.6 | 2.5 | 21.00 |
| F | S6, S8, S9, S21, S24, S29 | 6 | (XF,YF,ZF) | 16.4 | 1.1 | 23.00 |

FIG. 20

- ACQUIRED SATELLITE
   S2, S6, S7, S8, S9, S10, S21, S24, S26, S29
- EXTRACTED SATELLITE COMBINATION
   S7, S8, S9, S21, S24, S29

| ACQUIRED SATELLITE | ELEVATION ANGLE | SNR |
|---|---|---|
| S7 | 8° | 37.82 |
| S8 | 28° | 33.00 |
| S9 | 16° | 35.00 |
| S21 | 27° | 37.07 |
| S24 | 58° | 43.83 |
| S29 | 72° | 41.29 |

- ACQUIRED SATELLITE OF WHICH ELEVATION ANGLE IS EQUAL TO OR LOWER THAN 15°
- AND SNR IS EQUAL TO OR SMALLER THAN 40
   S7 → STORED AS LOW-ELEVATION-ANGLE SATELLITE DATA
- SUB-POSITIONING SATELLITE COMBINATION
   S8, S9, S21, S24, S29
- HORIZONTAL DISTANCE BETWEEN MASTER LOCATED POSITION AND SUB-LOCATED POSITION
   587.27 m>100 m → ADDS S7 TO LOW-ACCURACY SATELLITE DATA
- DELETES SATELLITE COMBINATION AND SUBTRACTS POINT FROM EVALUATION POINT

| SATELLITE COMBINATION | ACQUIRED SATELLITE | |
|---|---|---|
| A | S7, S8, S9, S21, S24, S29 | → DELETE |
| B | S7, S8, S9, S24, S26, S29 | → SUBTRACTS POINT FROM EVALUATION POINT |
| C | S7, S8, S9, S10, S24, S29 | → SUBTRACTS POINT FROM EVALUATION POINT |
| D | S6, S8, S9, S24, S26, S29 | |
| E | S8, S9, S21, S24, S26, S29 | |
| F | S6, S8, S9, S21, S24, S29 | |

- SELECTS OPTIMUM SATELLITE COMBINATION

| SATELLITE COMBINATION | ACQUIRED SATELLITE | EVALUATION POINT | |
|---|---|---|---|
| B | S7, S8, S9, S24, S26, S29 | −15.00 | |
| C | S7, S8, S9, S10, S24, S29 | −18.00 | |
| D | S6, S8, S9, S24, S26, S29 | 20.00 | |
| E | S8, S9, S21, S24, S26, S29 | 21.00 | |
| F | S6, S8, S9, S21, S24, S29 | 23.00 | → OPTIMUM COMBINATION |

- OUTPUTS POSITIONING RESULT POSITION
   OUTPUTS MASTER LOCATED POSITION OF OPTIMUM COMBINATION "F"

POSITIONING METHOD, POSITIONING DEVICE, AND ELECTRONIC INSTRUMENT

Japanese Patent Application No. 2007-274697 filed on Oct. 23, 2007, is hereby incorporated by reference in its entirety.

BACKGROUND

The present invention relates to a positioning method, a positioning device, and an electronic instrument.

The global positioning system (GPS) has been widely known as a positioning system that utilizes a satellite. The GPS has been utilized for a positioning device provided in a portable telephone, a car navigation system, or the like. A GPS terminal locates its current position by calculating four parameters (i.e., three-dimensional coordinate value which indicates the position of the terminal and a clock error) based on information such as the positions of a plurality of GPS satellites and the pseudo-range between each GPS satellite and the terminal (i.e., positioning calculations).

A GPS satellite signal affected by a multipath may be included in the GPS satellite signals acquired by the GPS receiver. The current position may not be calculated (located) accurately when using a GPS satellite signal affected by a multipath. Specifically, it is necessary to perform positioning calculations while excluding a GPS satellite signal affected by a multipath from the acquired GPS satellite signals. As a method that determines a GPS satellite signal affected by a multipath, a method using an a priori residual (APR) has been known (see JP-A-2003-240836, for example).

In an open-sky environment, the positioning accuracy is generally improved by increasing the number of satellites used for positioning calculations. However, when a building or the like exists in a low elevation angle range with respect to the position to be located, the building may hinder a signal transmitted from a GPS satellite that exists in the direction of the building so that the signal may be affected by a multipath even in the open-sky environment. When performing positioning calculations while increasing the number of satellites, the located position calculated by the positioning calculations may differ to a large extent from the actual position when a signal affected by a multipath is included. This causes the positioning accuracy to deteriorate, whereby a positioning result with low reliability is obtained.

SUMMARY

According to one aspect of the invention, there is provided a positioning method that performs current position calculations and outputs a positioning result position, the positioning method comprising:

searching for satellite signals transmitted from positioning satellites to acquire satellites;

combining satellites among the acquired satellites to extract satellite sets used for positioning;

performing first positioning calculations on each calculation-target satellite set among the extracted satellite sets using the satellite signals transmitted from the acquired satellites included in the calculation-target satellite set, performing second positioning calculations on each calculation-target satellite set among the extracted satellite sets using the satellite signals transmitted from the acquired satellites that are included in the calculation-target satellite set, but do not include a low-elevation-angle satellite, and determining whether or not a positioning result obtained using the calculation-target satellite set is appropriate based on the difference between a position calculated by the first positioning calculations and a position calculated by the second positioning calculations, the elevation angle of the low-elevation-angle satellite satisfying a given low elevation angle condition; and determining the positioning result position from the positions calculated by the first positioning calculations on the satellite sets for which the positioning result has been determined to be appropriate.

According to another aspect of the invention, there is provided a positioning device that performs current position calculations and outputs a positioning result position, the positioning device comprising:

a satellite acquisition section that searches for satellite signals transmitted from positioning satellites to acquire satellites;

a satellite set extraction section that combines satellites among the acquired satellites to extract satellite sets used for positioning;

a positioning calculation section that performs first positioning calculations on each calculation-target satellite set among the extracted satellite sets using the satellite signals transmitted from the acquired satellites included in the calculation-target satellite set, performs second positioning calculations on each calculation-target satellite set among the extracted satellite sets using the satellite signals transmitted from the acquired satellites that are included in the calculation-target satellite set, but do not include a low-elevation-angle satellite, and determines whether or not a positioning result obtained using the calculation-target satellite set is appropriate based on the difference between a position calculated by the first positioning calculations and a position calculated by the second positioning calculations, the elevation angle of the low-elevation-angle satellite satisfying a given low elevation angle condition; and a positioning result position determination section that determines the positioning result position from the positions calculated by the first positioning calculations on the satellite sets for which the positioning result has been determined to be appropriate.

BRIEF DESCRIPTION OF THE DRAWINGS

FIG. 11 is a view showing a data configuration example of satellite combination data.

FIG. 20 is a view showing an example of experimental results.

DESCRIPTION OF EXEMPLARY EMBODIMENTS

Figure 1:
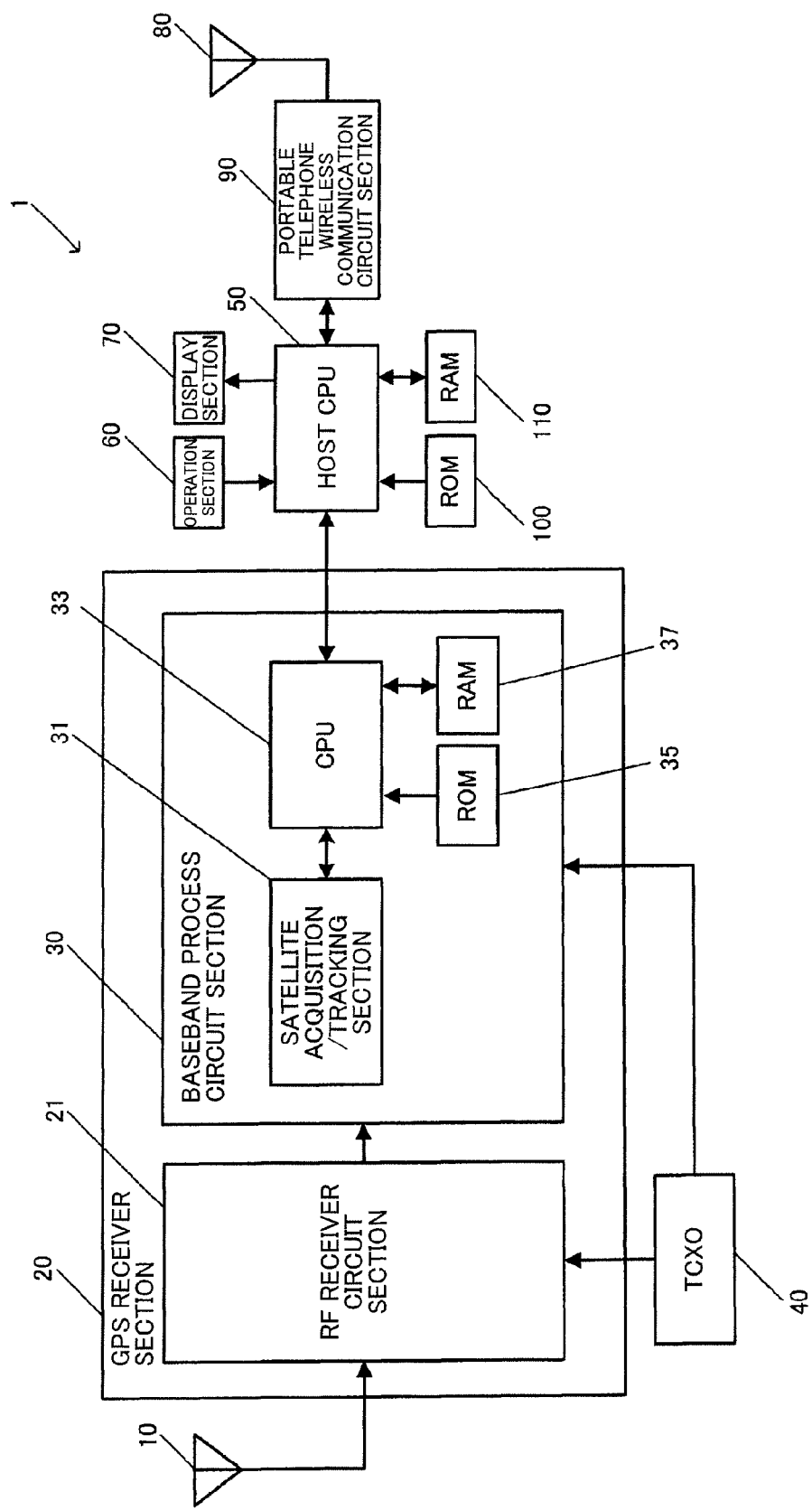
FIG. 1 is a block diagram showing the functional configuration of a portable telephone.

According to one embodiment of the invention, there is provided a positioning method that performs current position calculations and outputs a positioning result position, the positioning method comprising:

searching for satellite signals transmitted from positioning satellites to acquire satellites;

combining satellites among the acquired satellites to extract satellite sets used for positioning;

performing first positioning calculations on each calculation-target satellite set among the extracted satellite sets using the satellite signals transmitted from the acquired satellites included in the calculation-target satellite set, performing second positioning calculations on each calculation-target satellite set among the extracted satellite sets using the satellite signals transmitted from the acquired satellites that are included in the calculation-target satellite set, but do not include a low-elevation-angle satellite, and determining whether or not a positioning result obtained using the calculation-target satellite set is appropriate based on the difference between a position calculated by the first positioning calculations and a position calculated by the second positioning calculations, the elevation angle of the low-elevation-angle satellite satisfying a given low elevation angle condition; and determining the positioning result position from the positions calculated by the first positioning calculations on the satellite sets for which the positioning result has been determined to be appropriate.

According to another embodiment of the invention, there is provided a positioning device that performs current position calculations and outputs a positioning result position, the positioning device comprising:

a satellite acquisition section that searches for satellite signals transmitted from positioning satellites to acquire satellites;

a satellite set extraction section that combines satellites among the acquired satellites to extract satellite sets used for positioning;

a positioning calculation section that performs first positioning calculations on each calculation-target satellite set among the extracted satellite sets using the satellite signals transmitted from the acquired satellites included in the calculation-target satellite set, performs second positioning calculations on each calculation-target satellite set among the extracted satellite sets using the satellite signals transmitted from the acquired satellites that are included in the calculation-target satellite set, but do not include a low-elevation-angle satellite, and determines whether or not a positioning result obtained using the calculation-target satellite set is appropriate based on the difference between a position calculated by the first positioning calculations and a position calculated by the second positioning calculations, the elevation angle of the low-elevation-angle satellite satisfying a given low elevation angle condition; and a positioning result position determination section that determines the positioning result position from the positions calculated by the first positioning calculations on the satellite sets for which the positioning result has been determined to be appropriate.

According to the above configuration, the satellite sets used for positioning are extracted by combining the acquired satellites, and the first positioning calculations using the satellite signals transmitted from the acquired satellites included in the satellite set and the second positioning calculations using the satellite signals transmitted from the acquired satellites other than the low-elevation-angle satellite are performed on each of the extracted satellite sets. Whether or not the positioning result obtained using the satellite set is appropriate is determined based on the difference between the position calculated by the first positioning calculations and the position calculated by the second positioning calculations, and the positioning result position is determined from the positions calculated by the first positioning calculations on the satellite sets for which the positioning result has been determined to be appropriate.

A low-elevation-angle satellite is likely to be affected by a multipath. When a low-elevation-angle satellite affected by a multipath exists, the accuracy of the located position calculated by the second positioning calculations using the satellite signals transmitted from the acquired satellites other than the low-elevation-angle satellite is considered to be higher than that of the located position calculated by the first positioning calculations using the satellite signals transmitted from the acquired satellites including the low-elevation-angle satellite (i.e., closer to the actual position). Therefore, since it can be determined that the low-elevation-angle satellite is affected by a multipath when the difference between the position calculated by the first positioning calculations and the position calculated by the second positioning calculations is large, a located position with low positioning accuracy can be appropriately excluded by determining that the positioning result obtained using the satellite set is inappropriate. A positioning result with high reliability can be obtained by determining the positioning result position from the remaining located positions.

According to another embodiment of the invention, there is provided a positioning method that performs current position calculations and outputs a positioning result position, the positioning method comprising:

searching for satellite signals transmitted from positioning satellites to acquire satellites;

combining satellites among the acquired satellites to extract satellite sets used for positioning;

performing first positioning calculations on each calculation-target satellite set among the extracted satellite sets using the satellite signals transmitted from the acquired satellites included in the calculation-target satellite set, performing second positioning calculations on each calculation-target satellite set among the extracted satellite sets using the satellite signals transmitted from the acquired satellites that are included in the calculation-target satellite set, but do not include a low-elevation-angle satellite, and determining whether or not a positioning result obtained using the calculation-target satellite set is appropriate based on the difference between a position calculated by the first positioning calculations and a position calculated by the second positioning calculations, the elevation angle of the low-elevation-angle satellite satisfying a given low elevation angle condition;

determining the low-elevation-angle satellite included in the satellite set for which the positioning result has been determined to be inappropriate to be an inappropriate satellite;

evaluating a position calculated by the first positioning calculations on each of the extracted satellite sets based on a given criteria;

lowering the evaluation corresponding to a satellite set that is included in the extracted satellite sets and includes the satellite determined to be the inappropriate satellite; and determining the positioning result position from the positions calculated by the first positioning calculations on the extracted satellite sets based on the evaluations corresponding to the extracted satellite sets.

According to the above configuration, the satellite sets used for positioning are extracted by combining the acquired satellites, and the first positioning calculations using the satellite signals transmitted from the acquired satellites included in the satellite set and the second positioning calculations using the satellite signals transmitted from the acquired satellites other than the low-elevation-angle satellite are performed on each of the extracted satellite sets. Whether or not the positioning result obtained using the satellite set is appropriate is determined based on the difference between the position calculated by the first positioning calculations and the position calculated by the second positioning calculations. The position calculated by the first positioning calculations on each of the extracted satellite sets is evaluated, and the evaluation corresponding to the satellite set that includes the satellite determined to be the inappropriate satellite is lowered. The positioning result position is determined from the positions calculated by the first positioning calculations on the extracted satellite sets based on the evaluations corresponding to the satellite sets.

Since the low-elevation-angle satellite included in the satellite set for which the positioning result has been determined to be inappropriate is determined to be the inappropriate satellite and the evaluation corresponding to the satellite set including the inappropriate satellite is lowered, the position located using the satellite set including the inappropriate satellite is not selected as the positioning result position. Therefore, a positioning result with high reliability can be obtained.

The positioning method may further comprise:

determining the low-elevation-angle satellite included in the satellite set for which the positioning result has been determined to be inappropriate to be an inappropriate satellite;

evaluating a position calculated by the first positioning calculations on each of the extracted satellite sets based on a given criteria; and lowering the evaluation corresponding to a satellite set that is included in the extracted satellite sets and includes the satellite determined to be the inappropriate satellite, and the positioning result position may be determined based on the evaluations corresponding to the extracted satellite sets.

According to the above configuration, the low-elevation-angle satellite included in the satellite set for which the positioning result has been determined to be inappropriate is determined to be the inappropriate satellite, and the position calculated by the first positioning calculations on each of the extracted satellite sets is evaluated. The evaluation corresponding to the satellite set including the satellite determined to be the inappropriate satellite is lowered, and the positioning result position is determined based on the evaluations corresponding to the extracted satellite sets. Therefore, the same effects as in the above embodiments can be achieved.

The positioning method may further comprise:

determining the low-elevation-angle satellite included in the satellite set for which the positioning result has been determined to be inappropriate to be an inappropriate satellite, and the positioning result position may be determined from the positions calculated by the first positioning calculations on the satellite sets for which the positioning result has been determined to be appropriate and which do not include the inappropriate satellite.

According to the above configuration, the low-elevation-angle satellite included in the satellite set for which the positioning result has been determined to be inappropriate is determined to be the inappropriate satellite, and the positioning result position is determined from the positions calculated by the first positioning calculations on the satellite sets for which the positioning result has been determined to be appropriate and which do not include the inappropriate satellite. Therefore, the same effects as in the above embodiments can be achieved.

In the positioning method, the second positioning calculations may be performed using the satellite signals transmitted from the acquired satellites that are included in the calculation-target satellite set, but do not include an acquired satellite of which the elevation angle satisfies the given low elevation angle condition and a value that indicates the signal quality of the satellite signal received from that acquired satellite satisfies a given low quality condition.

According to the above configuration, the second positioning calculations are performed using the satellite signals transmitted from the acquired satellites included in the satellite set other than the acquired satellite of which the elevation angle satisfies the given low elevation angle condition and a value that indicates the signal quality of the satellite signal received from the acquired satellite satisfies the given low quality condition. Therefore, the calculation accuracy of the second positioning calculations can be improved so that the satellite set appropriateness determination reliability can be improved.

According to another embodiment of the invention, there is provided an electronic instrument comprising one of the above positioning devices.

Embodiments of the invention are described below with reference to the drawings. Note that the following embodiments do not in any way limit the scope of the invention laid out in the claims. Note that all elements of the following embodiments should not necessarily be taken as essential requirements for the invention.

An example in which an electronic instrument including a positioning device is a portable telephone and a positioning system is the GPS is described below.

1. Functional Configuration

FIG. 1 is a block diagram showing the functional configuration of a portable telephone 1 according to one embodiment of the invention. The portable telephone 1 includes a GPS antenna 10, a GPS receiver section 20, a temperature-compensated crystal oscillator (TCXO) 40, a host central processing unit (CPU) 50, an operation section 60, a display section 70, a portable telephone antenna 80, a portable telephone wireless communication circuit section 90, a read-only memory (ROM) 100, and a random access memory (RAM) 110.

The GPS antenna 10 receives an RF signal including a GPS satellite signal transmitted from a GPS satellite, and outputs the received signal to the GPS receiver section 20. The GPS satellite signal is a spread spectrum modulated signal referred to as a coarse and acquisition (C/A) code. The GPS satellite signal is superimposed on a carrier in an L1 band (carrier frequency: 1.57542 GHz).

The GPS receiver section 20 is a positioning section that locates the current position of the portable telephone 1 based on the signal output from the GPS antenna 10. The GPS receiver section 20 is a functional block corresponding to a GPS receiver. The GPS receiver section 20 includes a radio frequency (RF) receiver circuit section 21 and a baseband process circuit section 30. The RF receiver circuit section 21 and the baseband process circuit section 30 may be produced as different large scale integrated (LSI) circuits, or may be incorporated in one chip.

The RF receiver circuit section 21 is a high-frequency signal (RF signal) circuit block. The RF receiver circuit section 21 generates an RF signal multiplication oscillation signal by dividing or multiplying the frequency of the oscillation signal generated by the TCXO 40. The RF receiver circuit section 21 down-converts the RF signal into an intermediate-frequency signal (hereinafter referred to as "IF signal") by multiplying the RF signal output from the GPS antenna 10 by the generated oscillation signal, subjecting the IF signal to amplification and the like, converting the resulting signal into a digital signal using an A/D converter, and outputting the digital signal to the baseband process circuit section 30.

The baseband process circuit section 30 is a circuit section that acquires/extracts the GPS satellite signal by performing a correlation detection process and the like on the IF signal output from the RF receiver circuit section 21, decodes data contained in the GPS satellite signal to extract a navigation message, time information, and the like, and performs positioning calculations. The baseband process circuit section 30 includes a satellite acquisition/tracking section 31, a CPU 33 (processor), a ROM 35 (memory), and a RAM 37 (memory). In this embodiment, the CPU 33 calculates the current position. Note that the host CPU 50 may calculate the current position.

The satellite acquisition/tracking section 31 is a circuit section that acquires/tracks the GPS satellite signal based on the IF signal output from the RF receiver circuit section 21. The GPS satellite signal is acquired by a correlation process that calculates the correlation value of a pseudo-generated spread code (C/A code replica) and the IF signal, and extracts a frequency component having the largest amplitude and a phase component.

The GPS satellite signal is tracked by tracking the phases of the C/A code included in the GPS satellite signal and the carrier utilizing circuits such as a code loop known as a delay locked loop (DLL) and a carrier loop known as a phase locked loop (PLL), for example.

Figure 2:
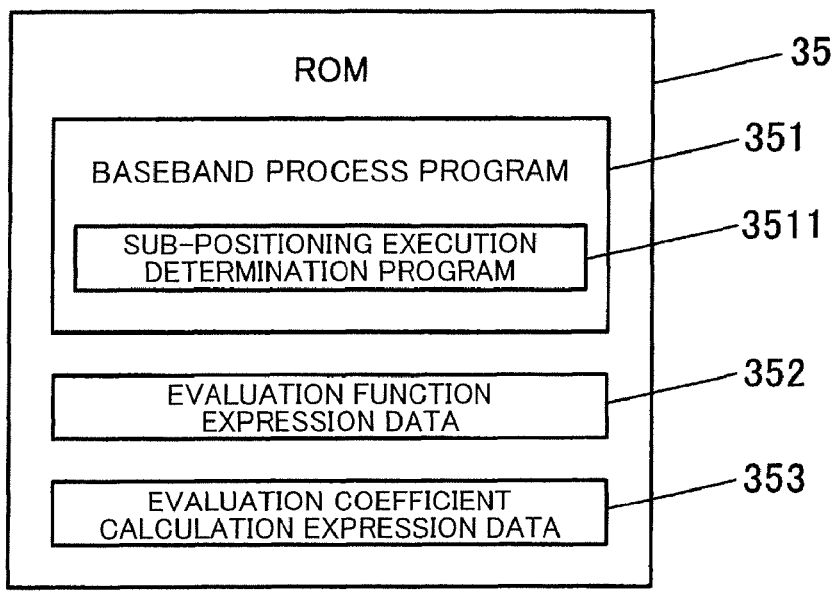
FIG. 2 is a view showing an example of data stored in a ROM.

FIG. 2 is a view showing an example of data stored in the ROM 35. The ROM 35 stores a baseband process program 351 that is read by the CPU 33 and executed as a baseband process (see FIGS. 16 and 17), evaluation function expression data 352, and evaluation coefficient calculation expression data 353. The baseband process program 351 includes a sub-positioning execution determination program 3511 executed as a sub-positioning execution determination process (see FIG. 18) as a subroutine.

In the baseband process, the CPU 33 extracts a satellite combination (i.e., a combination of four or more acquired satellites (satellite set)) from the acquired GPS satellites (hereinafter referred to as "acquired satellites"), and performs master positioning calculations (first positioning calculations) on each satellite combination to calculate a master located position. The CPU 33 determines whether or not to perform sub-positioning calculations (second positioning calculations) by performing the sub-positioning execution determination process. When the CPU 33 has determined to perform the sub-positioning calculations, the CPU 33 calculates a sub-located position by performing the sub-positioning calculations using a generated sub-positioning satellite combination, and determines whether or not the master located position is appropriate based on the difference between the master located position and the sub-located position.

The CPU 33 determines the acquired satellite that reduces the accuracy of the master located position to be a low-accuracy satellite (inappropriate satellite) based on the determination result for the appropriateness of the master located position, and calculates an evaluation point E of each satellite combination using a calculating method described later. The CPU 33 subtracts a point from the evaluation point E of the satellite combination including the low-accuracy satellite, selects the satellite combination having the highest evaluation point E as an optimum combination, determines the master located position of the optimum combination to be a positioning result position, and outputs the positioning result position. The details of the baseband process are described later using a flowchart.

In the sub-positioning execution determination process, the CPU 33 generates a sub-positioning satellite combination that includes the acquired satellites other than a low-elevation-angle satellite corresponding to each satellite combination, the low-elevation-angle satellite being an acquired satellite included in each satellite combination of which the elevation angle satisfies a given low elevation angle condition and the quality of the received satellite signal satisfies a given low quality condition. Note that the sub-positioning satellite combination may be generated while determining an acquired satellite of which the elevation angle satisfies the given low elevation angle condition to be the low-elevation-angle satellite. When the number of acquired satellites included in the sub-positioning satellite combination is equal to or larger than the number of positioning-enable satellites, the CPU 33 determines to perform sub-positioning. The details of the sub-positioning execution determination process are also described later using a flowchart.

A method of calculating the evaluation point E in the baseband process is described below.

Figure 4:
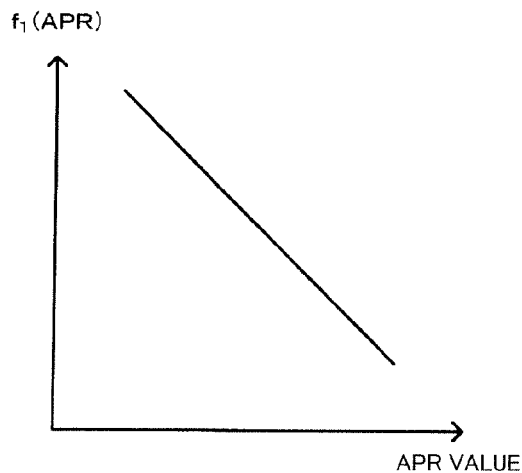
FIG. 4 is a graph showing an example of an evaluation function $f_1$.

The evaluation point E is calculated by the following evaluation point calculation expression (1) using the a priori residual (APR) (hereinafter referred to as "APR value") of the satellite combination, the position dilution of precision (PDOP) (hereinafter referred to as "PDOP value") of the satellite combination, and the number of satellites included in the satellite combination. The higher the evaluation point E, the higher the positioning accuracy is.

$$E = k_1 \times f_1(APR) + k_2 \times f_2(PDOP) + k_3 \times f_3(\text{number of satellites}) \quad (1)$$

where, $f_1$ is an evaluation function with respect to the APR value of the satellite combination. FIG. 4 shows an example of the evaluation function $f_1$. FIG. 4 shows a graph in which the horizontal axis indicates the APR value and the vertical axis indicates the evaluation function $f_1$. The larger the APR value, the smaller the evaluation function $f_1$ is.

The APR value of the satellite combination is given by the following expression (2), $$APR = \sum_{i}^{N} (ym_i - yp_i)^2 \quad (2)$$

where, N is the number of acquired satellites (number of satellites) included in the satellite combination, and i (=1, 2, . . . , N) indicates the ith acquired satellite among the acquired satellites included in the satellite combination. $ym_i$ is the pseudo-range between the ith acquired satellite and the portable telephone 1. $yp_i$ is the distance (approximate distance) between the position $(X_i, Y_i, Z_i)$ of the ith acquired satellite and the current position (x, y, z) of the portable telephone 1 obtained by positioning calculations, and is given by the following expression (3).

$$yp_i = \sqrt{(X_i-x)^2 + (Y_i-y)^2 + (Z_i-z)^2} \quad (3)$$

Specifically, the APR value is expressed by the sum of the square of the difference between the pseudo-range ym and the approximate distance yp of each acquired satellite of the satellite combination.

Figure 5:
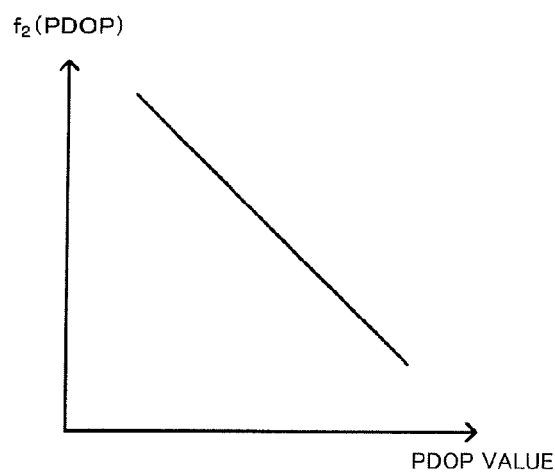
FIG. 5 is a graph showing an example of an evaluation function $f_2$.

In the expression (1), $f_2$ is an evaluation function with respect to the PDOP value of the satellite combination. FIG. 5 shows an example of the evaluation function $f_2$. FIG. 5 shows a graph in which the horizontal axis indicates the PDOP value and the vertical axis indicates the evaluation function $f_2$. The positioning accuracy generally increases as the PDOP value decreases. Therefore, the larger the PDOP value, the smaller the evaluation function $f_2$ is.

Figure 6:
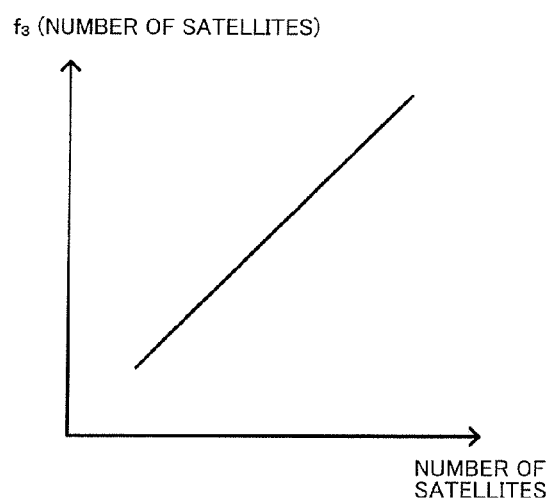
FIG. 6 is a graph showing an example of an evaluation function $f_3$.

In the expression (1), $f_3$ is an evaluation function with respect to the number of satellites included in the satellite combination. FIG. 6 shows an example of the evaluation function $f_3$. FIG. 6 shows a graph in which the horizontal axis indicates the number of satellites and the vertical axis indicates the evaluation function $f_3$. The positioning accuracy generally increases as the number of satellites increases. Therefore, the larger the number of satellites, the larger the evaluation function f3 is.

In the expression (1), $k_1$ to $k_3$ are coefficients (evaluation coefficients) for weighting the evaluation functions $f_1$ to $f_3$, respectively. Specifically, the evaluation coefficient $k_1$ is a weighting coefficient for the evaluation function $f_1$, the evaluation coefficient $k_2$ is a weighting coefficient for the evaluation function $f_2$, and the evaluation coefficient $k_3$ is a weighting coefficient for the evaluation function $f_3$. The evaluation coefficients $k_1$ to $k_3$ are determined corresponding to the average value of the APR values (hereinafter referred to as "APR average value"). The APR average value is the average value of the APR values of the generated satellite combinations.

Figure 7:
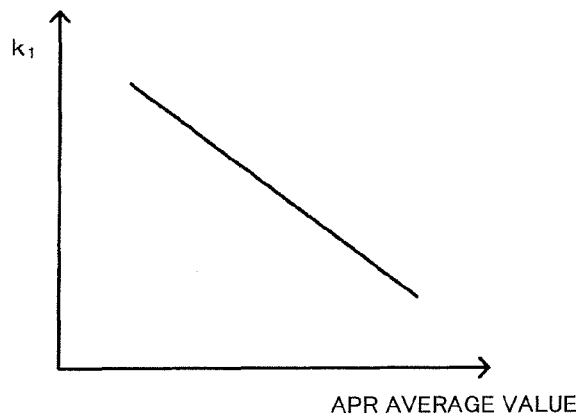
FIG. 7 is a graph showing an example of an evaluation coefficient $k_1$.

FIG. 7 shows an example of the evaluation coefficient $k_1$. FIG. 7 shows a graph in which the horizontal axis indicates the APR average value and the vertical axis indicates the evaluation coefficient $k_1$. The larger the APR average value, the smaller the evaluation coefficient $k_1$ is.

Figure 8:
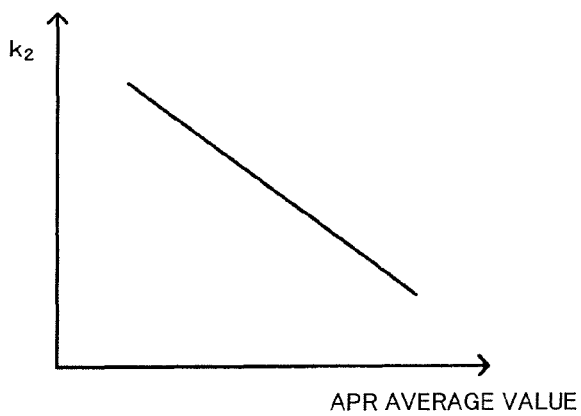
FIG. 8 is a graph showing an example of an evaluation coefficient $k_2$.

FIG. 8 shows an example of the evaluation coefficient $k_2$. FIG. 8 shows a graph in which the horizontal axis indicates the APR average value and the vertical axis indicates the evaluation coefficient $k_2$. The larger the APR average value, the smaller the evaluation coefficient $k_2$ is.

Figure 9:
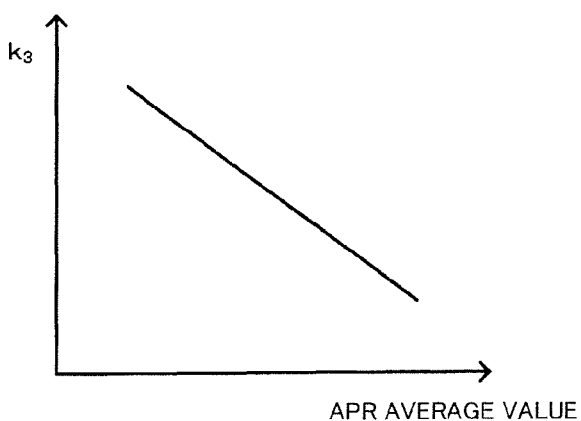
FIG. 9 is a graph showing an example of the evaluation coefficient $k_3$.

FIG. 9 shows an example of the evaluation coefficient $k_3$. FIG. 9 shows a graph in which the horizontal axis indicates the APR average value and the vertical axis indicates the evaluation coefficient $k_3$. The larger the APR average value, the smaller the evaluation coefficient $k_3$ is.

Again referring to FIG. 2, the evaluation function expression data 352 is data that defines the evaluation functions $f_1$ to $f_3$. For example, the function expressions of the graphs shown in FIGS. 4 to 6 are stored as the evaluation function expression data 352.

The evaluation coefficient calculation expression data 353 is data that defines the evaluation coefficients $k_1$ to $k_3$. For example, the function expressions of the graphs shown in FIGS. 7 to 9 are stored as the evaluation coefficient calculation expression data 353.

In the baseband process, the CPU 33 calculates the evaluation point E of the satellite combination according to the expression (1) using the APR value, the PDOP value, and the number of satellites of the satellite combination referring to the evaluation function expression data 352 and the evaluation coefficient calculation equation data 353.

Figure 3:
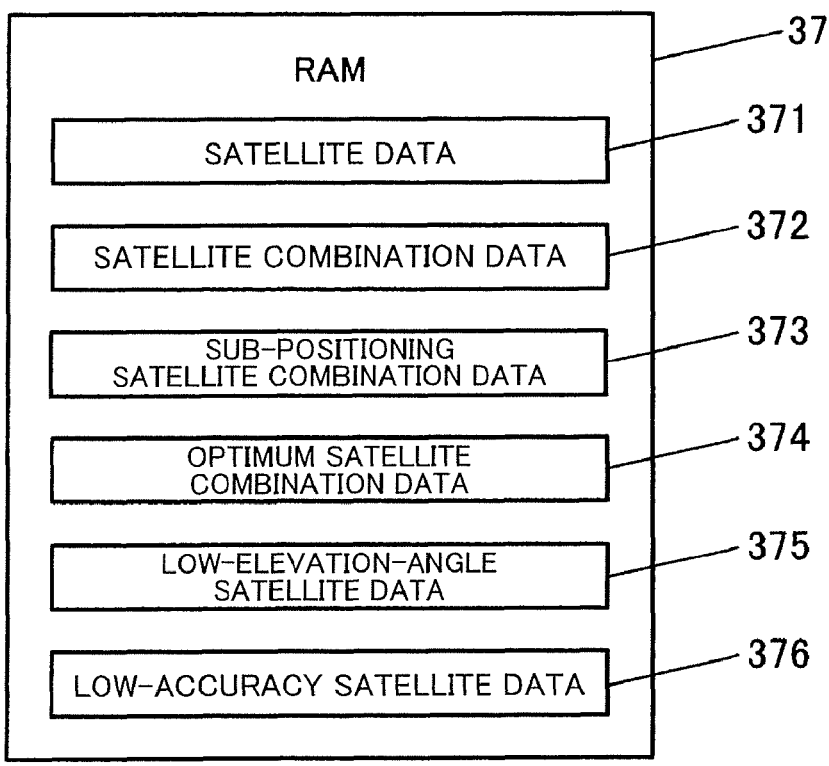
FIG. 3 is a view showing an example of data stored in a RAM.

FIG. 3 is a view showing an example of data stored in the RAM 37. The RAM 37 stores satellite data 371, satellite combination data 372, sub-positioning satellite combination data 373, optimum satellite combination data 374, low-elevation-angle satellite data 375, and low-accuracy satellite data 376.

Figure 10:
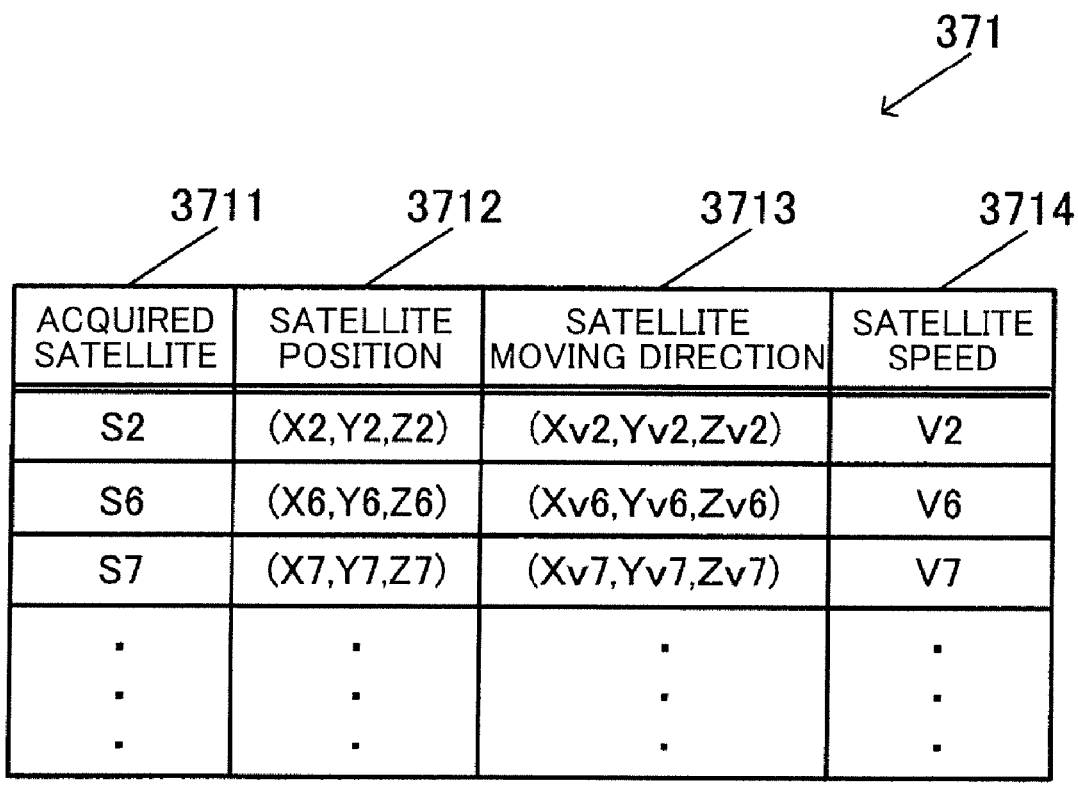
FIG. 10 is a view showing a data configuration example of satellite data.

FIG. 10 is a view showing a data configuration example of the satellite data 371. A satellite position 3712, a satellite moving direction 3713, and a satellite speed 3714 are stored as the satellite data 371 corresponding to each acquired satellite 3711. The satellite position 3712 is indicated by three-dimensional coordinates in the terrestrial reference frame, and the satellite moving direction 3713 is indicated by a three-dimensional unit vector in the terrestrial reference frame, for example. The satellite speed 3714 is a scalar quantity.

For example, the satellite position of an acquired satellite S2 is (X2, Y2, Z2), the satellite moving direction of the acquired satellite S2 is (Xv2, Yv2, Zv2), and the satellite speed of the acquired satellite S2 is V2. The satellite data 371 is updated by the CPU 33 in the baseband process.

FIG. 11 is a view showing a data configuration example of the satellite combination data 372. An acquired satellite 3722 included in each satellite combination, a number of satellites 3723, a master located position 3724, an APR value 3725, a PDOP value 3726, and an evaluation point 3727 are stored as the satellite combination data 372 corresponding to each satellite combination 3721.

For example, acquired satellites included in a satellite combination B are S7, S8, S9, S24, S26, and S29, the number of satellites is six, and the master located position calculated by the master positioning calculations using the satellite combination B is (XB, YB, ZB). The APR value of the satellite combination B is 62.9, the PDOP value of the satellite combination B is 1.9, and the evaluation point of the satellite combination B is −15.00. The satellite combination data 372 is updated by the CPU 33 in the baseband process.

Figure 12:
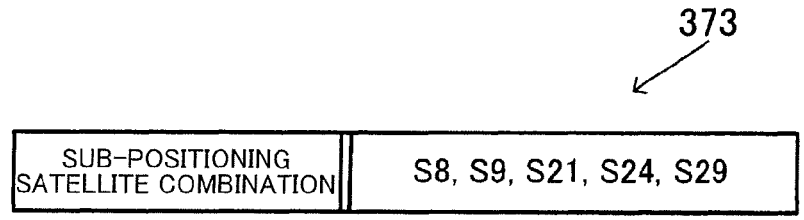
FIG. 12 is a view showing a data configuration example of sub-positioning satellite combination data.

FIG. 12 is a view showing a data configuration example of the sub-positioning satellite combination data 373. Acquired satellites included in the generated sub-positioning satellite combination are stored as the sub-positioning satellite combination data 373. In FIG. 12, the acquired satellites included in the sub-positioning satellite combination are S8, S9, S21, S24, and S29. The sub-positioning satellite combination data 373 is updated by the CPU 33 in the sub-positioning execution determination process.

Figure 13:
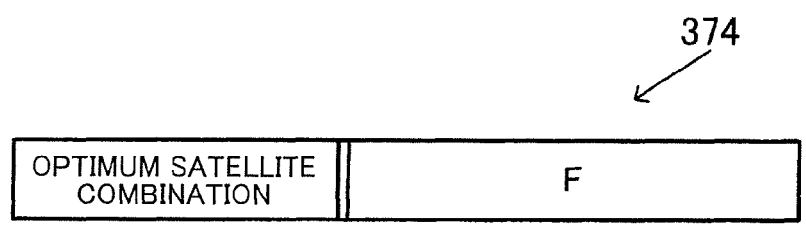
FIG. 13 is a view showing a data configuration example of optimum satellite combination data.

FIG. 13 is a view showing a data configuration example of the optimum satellite combination data 374. A satellite combination selected as the optimum satellite combination is stored as the optimum satellite combination data 374. The satellite combination corresponds to the satellite combination 3721 contained in the satellite combination data 372 shown in FIG. 11. In FIG. 13, the optimum satellite combination is the satellite combination F. The optimum satellite combination data 374 is updated by the CPU 33 in the baseband process.

Figure 14:
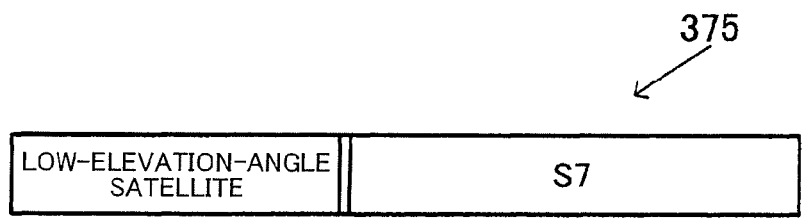
FIG. 14 is a view showing a data configuration example of low-elevation-angle satellite data.

FIG. 14 is a view showing a data configuration example of the low-elevation-angle satellite data 375. An acquired satellite determined to be the low-elevation-angle satellite is stored as the low-elevation-angle satellite data 375. In FIG. 14, the acquired satellite S7 is stored as the low-elevation-angle satellite. The low-elevation-angle satellite data 375 is updated by the CPU 33 in the sub-positioning execution determination process.

Figure 15:
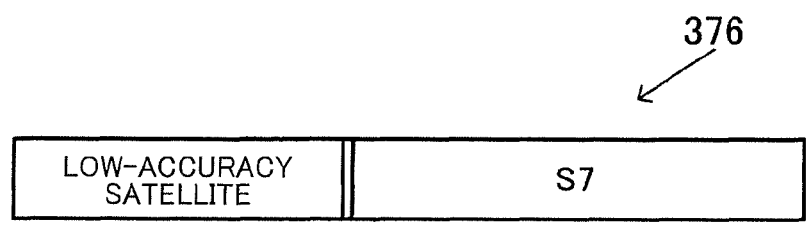
FIG. 15 is a view showing a data configuration example of low-accuracy satellite data.

FIG. 15 is a view showing a data configuration example of the low-accuracy satellite data 376. An acquired satellite determined to be the low-accuracy satellite is stored as the low-accuracy satellite data 376. In FIG. 15, the acquired satellite S7 is stored as the low-accuracy satellite. The low-accuracy satellite data 376 is updated by the CPU 33 in the baseband process.

The TCXO 40 is a temperature-compensated crystal oscillator that generates an oscillation signal at a given oscillation frequency. The TCXO 40 outputs the generated oscillation signal to the RF receiver circuit section 21 and the baseband process circuit section 30.

The host CPU 50 is a processor that controls each section of the portable telephone 1 based on various programs such as a system program stored in the ROM 100. The host CPU 50 causes the display section 70 to display a navigation screen in which the positioning result position input from the CPU 33 is plotted.

The operation section 60 is an input device including a touch panel, a button switch, or the like, and outputs a signal that indicates a key or a button that has been pressed to the host CPU 50. Various instruction inputs such as a telephone call request or an e-mail send/receive request are performed by operating the operation section 60.

The display section 70 is a display device that includes a liquid crystal display (LCD) or the like, and displays various images based on a display signal input from the host CPU 50. The display section 70 displays the navigation screen, time information, and the like.

The portable telephone antenna 80 is an antenna that transmits and receives a portable telephone radio signal between the portable telephone 1 and a radio base station installed by a communication service provider of the portable telephone 1.

The portable telephone wireless communication circuit section 90 is a portable telephone communication circuit section that includes an RF conversion circuit, a baseband process circuit, and the like. The portable telephone wireless communication circuit section 90 implements a telephone call, an e-mail send/receive process, or the like by modulating/demodulating the portable telephone radio signal, for example.

The ROM 100 stores a system program that causes the host CPU 50 to control the portable telephone 1, a program and data necessary for implementing a navigation function, and the like.

The RAM 110 serves as a work area that temporarily stores the system program executed by the host CPU 50, various process programs, processed data, processing results, and the like.

2. Process Flow

Figure 16:
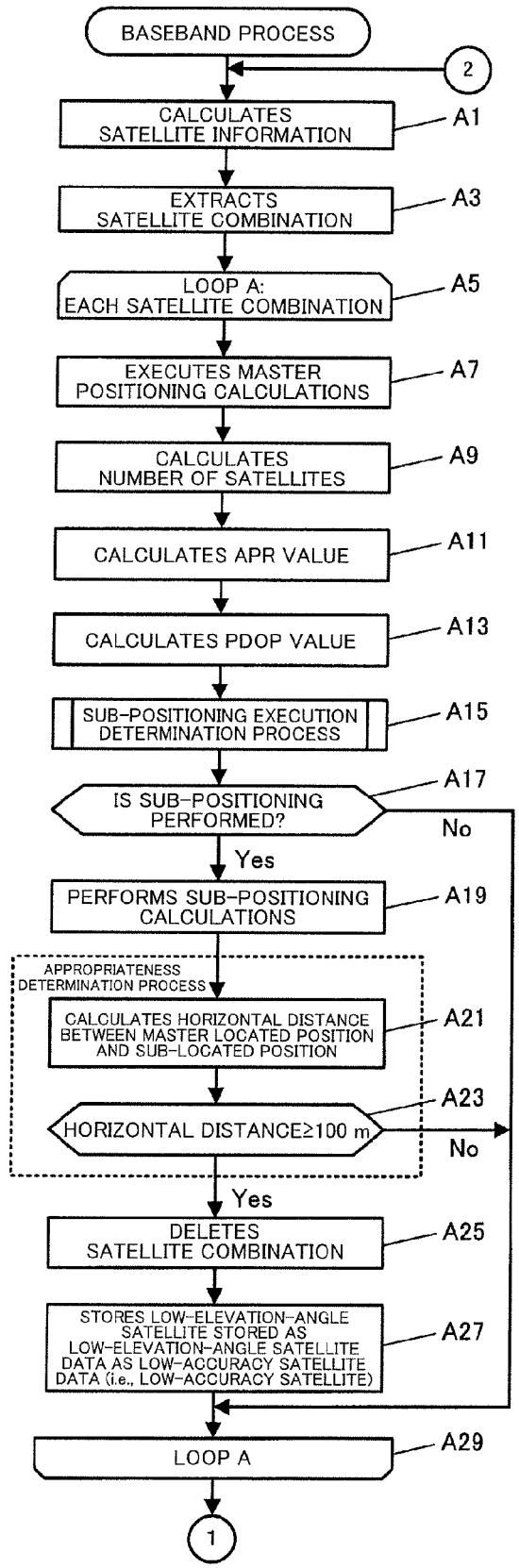
FIG. 16 is a flowchart showing the flow of a baseband process.
Figure 17:
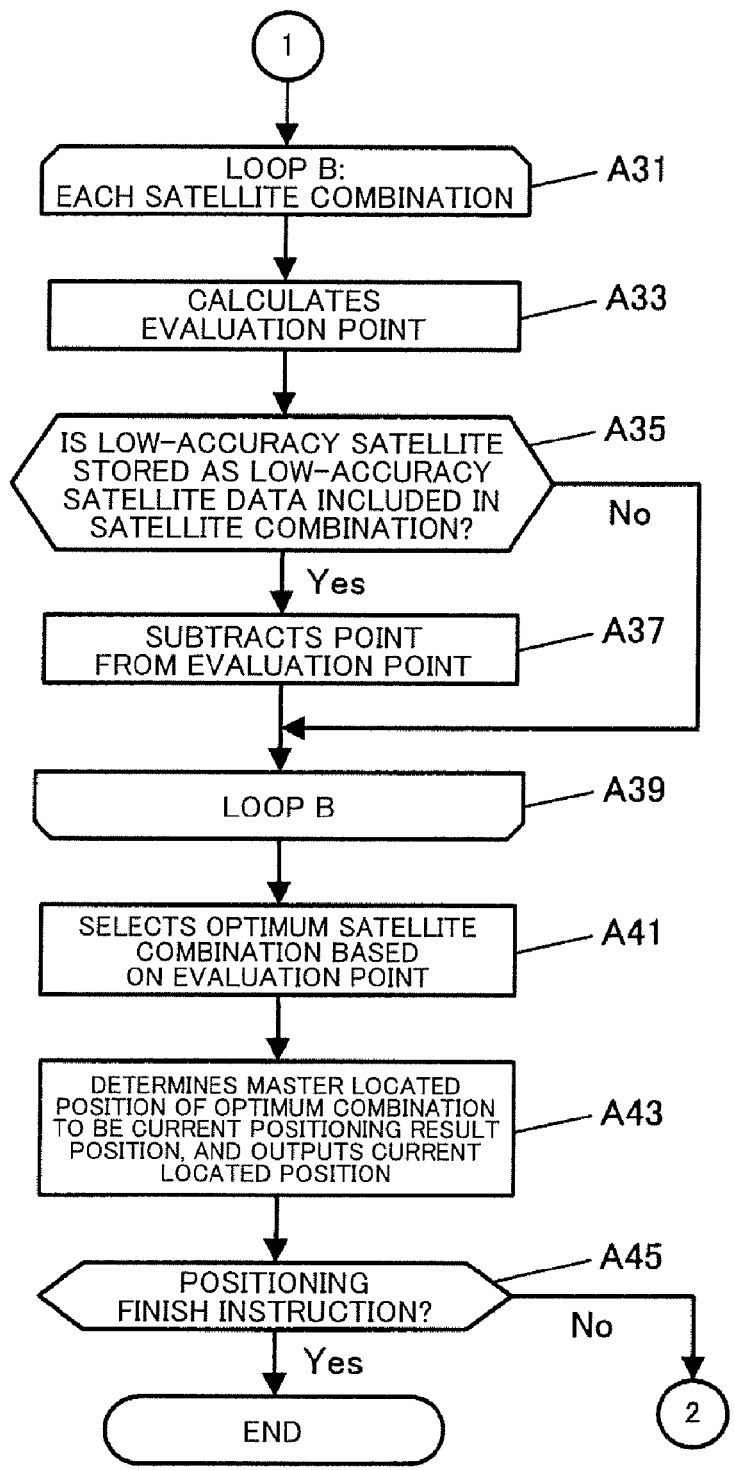
FIG. 17 is a flowchart showing the flow of a baseband process.

FIGS. 16 and 17 are flowcharts showing the flow of the baseband process performed in the portable telephone 1 by causing the CPU 33 to read and execute the baseband process program 351 stored in the ROM 35.

The baseband process is started when the CPU 33 has detected that the RF receiver circuit section 21 has received the GPS satellite signal and a positioning start instruction has been issued using the operation section 60. The baseband process is performed in parallel with various processes (e.g., execution of various application programs). An ON/OFF operation for the portable telephone 1 may be associated with GPS startup/suspension, and the baseband process may be started when it has been detected that power has been supplied to the portable telephone 1. The positioning calculations are performed every second in principle.

The baseband process is performed in a state in which the RF signal is received by the GPS antenna 10, the RF signal is down-converted into the IF signal by the RF reception circuit section 60, and the GPS satellite signal is acquired/tracked by the satellite acquisition/tracking section 31, as required.

The CPU 33 calculates the satellite position 3712, the satellite moving direction 3713, and the satellite speed 3714 of the acquired satellite based on the GPS satellite signal acquired by the satellite acquisition/tracking section 31, and stores satellite information associated with the acquired satellite 3711 in the RAM 37 as the satellite data 371 (step A1).

The CPU 33 then extracts a satellite combination (satellite set) that includes four or more acquired satellites based on the satellites acquired in the step A1 (step A3), and stores the satellite combination in the RAM 37 as the satellite combination data 372. The CPU 33 performs a loop A process on each satellite combination extracted in the step A3 (steps A5 to A29).

In the loop A, the CPU 33 calculates the master located position by performing the master positioning calculations (first positioning calculations) using a least-square method or the like based on the satellite information relating to each acquired satellite included in the satellite combination (step A7), and stores the master located position as the satellite combination data 372. The positioning calculations using the least-square method is known in the art. Therefore, detailed description thereof is omitted.

The CPU 33 then calculates the number of acquired satellites (number of satellites) included in the satellite combination (step A9), and stores the number of acquired satellites as the satellite combination data 372. The CPU 33 calculates the APR value of the satellite combination based on the master located position calculated in the step A7 (step A11), and stores the APR value as the satellite combination data 372. The CPU 33 also calculates the PDOP value of the satellite combination (step A13), and stores the PDOP value as the satellite combination data 372.

The CPU 33 then performs the sub-positioning execution determination process by reading and executing the sub-positioning execution determination program 3511 stored in the ROM 35 (step A15).

Figure 18:
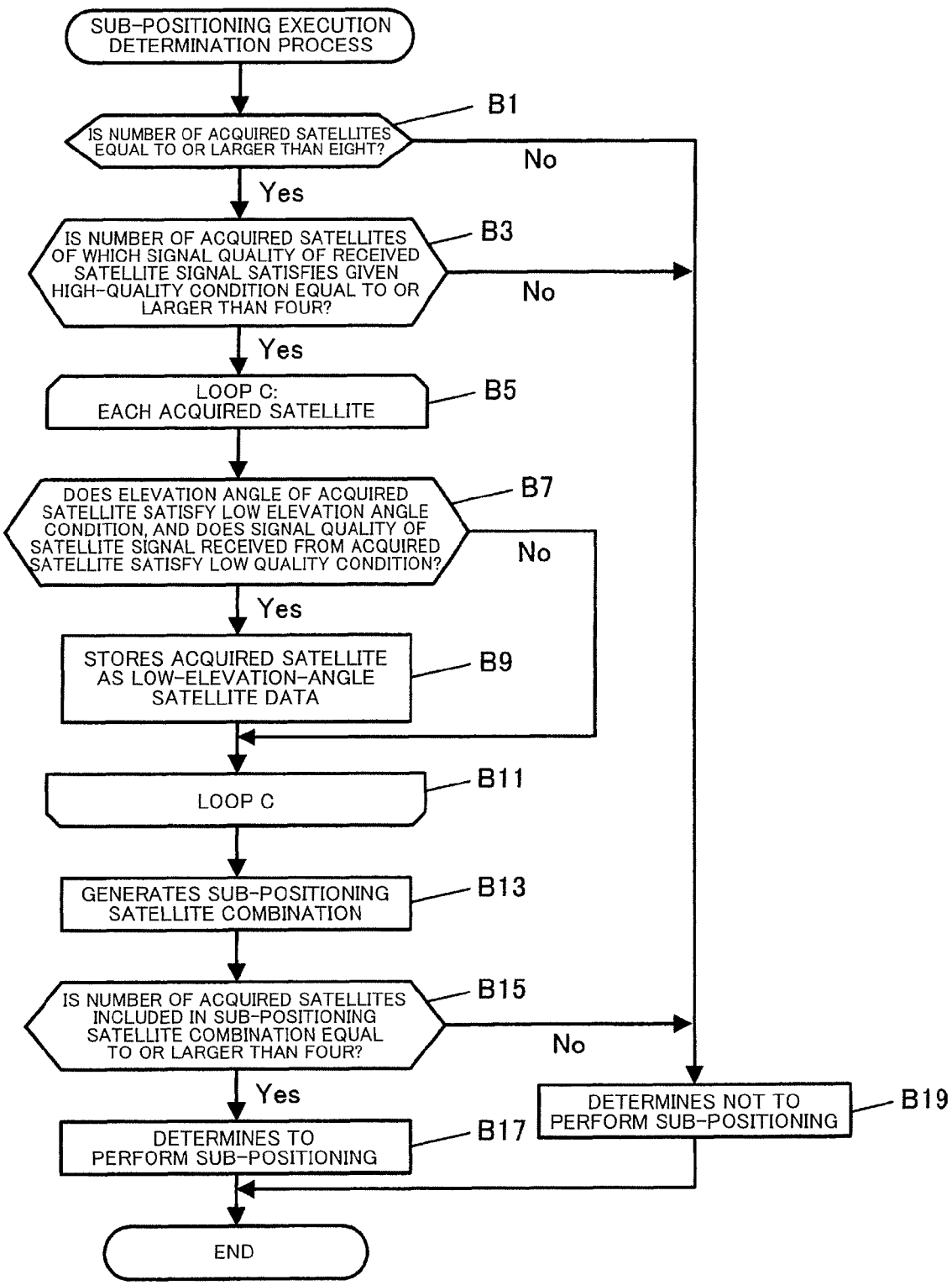
FIG. 18 is a flowchart showing the flow of a sub-positioning execution determination process.

FIG. 18 is a flowchart showing the flow of the sub-positioning execution determination process.

The CPU 33 determines whether or not the number of satellites acquired in the step A1 is equal to or larger than eight (step B1). The threshold value of the number of acquired satellites is set at eight taking into account an environment in which the satellite signal can be acquired relatively easily (e.g., open-sky environment).

When the CPU 33 has determined that the number of satellites acquired in the step A1 is equal to or larger than eight (step B1: Yes), the CPU 33 determines whether or not the number of acquired satellites of which the signal quality of the received satellite signal satisfies a given high-quality condition is equal to or larger than four (step B3). The high-quality condition is satisfied when the signal-to-noise ratio (SNR) of the received satellite signal is equal to or larger than 35, for example. The threshold value of the number of acquired satellites is set at four because at least four acquired satellites are necessary for three-dimensional positioning.

When the CPU 33 has determined that the number of acquired satellites of which the quality of the received satellite signal satisfies the given high-quality condition is equal to or larger than four (step B3: Yes), the CPU 33 performs a loop C process on each acquired satellite (steps B5 to B11). In the loop C, the CPU 33 determines whether or not the elevation angle of the acquired satellite satisfies a given low elevation angle condition and the signal quality of the satellite signal received from the acquired satellite satisfies a given low quality condition (step B7). The low elevation angle condition is satisfied when the elevation angle of the acquired satellite is equal to or lower than 150, for example. The low-quality condition is satisfied when the SNR of the received satellite signal is equal to or smaller than 40, for example.

When the CPU 33 has determined that the elevation angle of the acquired satellite does not satisfy the given low elevation angle condition and the signal quality of the satellite signal received from the acquired satellite does not satisfy the given low quality condition (step B7: No), the CPU 33 performs the loop C process on the next acquired satellite. When the CPU 33 has determined that the elevation angle of the acquired satellite satisfies the given low elevation angle condition and the signal quality of the satellite signal received from the acquired satellite satisfies the given low quality condition (step B7: Yes), the CPU 33 stores the acquired satellite (i.e., low-elevation-angle satellite) in the RAM 37 as the low-elevation-angle satellite data 375 (step B9), and performs the loop C process on the next acquired satellite. When the CPU 33 has performed the process in the steps B7 and B9 on all of the acquired satellites, the CPU 33 finishes the loop C (step B11).

The CPU 33 then excludes the low-elevation-angle satellite stored as the low-elevation-angle satellite data 375 in the step B9 from the acquired satellites included in the satellite combination to generate a sub-positioning satellite combination (step B13). The CPU 33 determines whether or not the number of acquired satellites included in the generated sub-positioning satellite combination is equal to or larger than four (step B15). When the CPU 33 has determined that the number of acquired satellites included in the sub-positioning satellite combination is equal to or larger than four (step B15: Yes), the CPU 33 determines to perform sub-positioning (step B17), and finishes the sub-positioning execution determination process.

When the CPU 33 has determined that the number of acquired satellites is less than eight in the step B1 (step B1: No), or has determined that the number of acquired satellites of which the signal quality of the received satellite signal satisfies the given high-quality condition is less than four in the step B3 (step B3: No), the CPU 33 determines not to perform sub-positioning (step B19), and finishes the sub-positioning execution determination process. When the CPU 33 has determined that the number of acquired satellites included in the sub-positioning satellite combination is less than four in the step B15 (step B15: No), the CPU 33 determines not to perform sub-positioning.

Again referring to the baseband process shown in FIG. 16, when the CPU 33 has determined not to perform sub-positioning as a result of the sub-positioning execution determination process (step A17: No), the CPU 33 performs the baseband process on the next satellite combination. When the CPU 33 has determined to perform sub-positioning (step A17: Yes), the CPU 33 calculates the sub-located position by performing the sub-positioning calculations (second positioning calculations) using a least-square method or the like based on the satellite information relating to each acquired satellite included in the sub-positioning satellite combination generated in the step B13 (step A19).

The CPU 33 then performs an appropriateness determination process on the master located position of the satellite combination (steps A21 and A23). Specifically, the CPU 33 calculates the horizontal distance between the master located position of the satellite combination and the sub-located position of the sub-positioning satellite combination (step A21). The CPU 33 determines whether or not the calculated horizontal distance is equal to or larger than 100 m, for example (step A23). When the CPU 33 has determined that the calculated horizontal distance is less than 100 m (step A23: No), the CPU 33 determines that the master located position of the satellite combination is appropriate, and performs the process on the next satellite combination.

When the CPU 33 has determined that the calculated horizontal distance is equal to or larger than 100 m (step A23: Yes), the CPU 33 determines that the master located position of the satellite combination is inappropriate, and deletes the satellite combination from the satellite combination data 372 stored in the RAM 37 (step A25). The CPU 33 stores the low-elevation-angle satellite stored as the low-elevation-angle satellite data 375 in the step B9 in the RAM 37 as the low-accuracy satellite data 376 (i.e., low-accuracy satellite (inappropriate satellite)) (step A27). The CPU 33 then performs the process on the next satellite combination.

Since the sub-positioning satellite combination is a combination obtained by removing the low-elevation-angle satellite from the satellite combination, the sub-located position calculated by the sub-positioning calculations is considered to be a highly accurate located position that is not affected by a multipath. Therefore, when the horizontal distance between the master located position and the sub-located position is large, the master located position of the satellite combination is likely to have low reliability. In this embodiment, when the horizontal distance between the master located position and the sub-located position is equal to or larger than a given threshold distance (e.g., 100 m), the master located position of the satellite combination is determined to be inappropriate.

When the CPU 33 has performed the process in the steps A7 and A27 on all of the satellite combinations, the CPU 33 finishes the loop A (step A29). The CPU 33 then performs a loop B process on each satellite combination (steps A31 to A39). In the loop B, the CPU 33 calculates the evaluation point E according to the expression (1) using the number of satellites, the APR value, and the PDOP value of the satellite combination calculated in the steps A9 to A13 referring to the evaluation function expression data 352 and the evaluation coefficient calculation equation data 353 stored in the ROM 35 (step A33).

The CPU 33 determines whether or not the low-accuracy satellite stored in the RAM 37 as the low-accuracy satellite data 376 is included in the satellite combination (step A35). When the CPU 33 has determined that the low-accuracy satellite is not included in the satellite combination (step A35: No), the CPU 33 performs the process on the next acquired satellite. When the CPU 33 has determined that the low-accuracy satellite is included in the satellite combination (step A35: Yes), the CPU 33 subtracts 30 point from the evaluation point E calculated in the step A33, for example (step A37). The CPU 33 then performs the process on the next satellite combination.

When the CPU 33 has performed the process in the steps A33 and A37 on all of the satellite combinations, the CPU 33 finishes the loop B (step A39). The CPU 33 then selects the optimum satellite combination based on the evaluation point E of each satellite combination (step A41). Specifically, the CPU 33 selects the satellite combination having the highest evaluation point E as the optimum satellite combination, and stores the optimum satellite combination in the RAM 37 as the optimum satellite combination data 374.

The CPU 33 then determines the master located position of the optimum combination stored as the satellite combination data 372 to be the current positioning result position, and outputs the current located position to the host CPU 50 (step A43). The CPU 33 then determines whether or not the user has issued a positioning finish instruction using the operation section 60 (step A45). When the CPU 33 has determined that the user has not issued the positioning finish instruction (step A45: No), the CPU 33 returns to the step A1. When the CPU 33 has determined that the user has issued the positioning finish instruction (step A45: Yes), the CPU 33 finishes the baseband process.

3. Experimental Results

Figure 19:
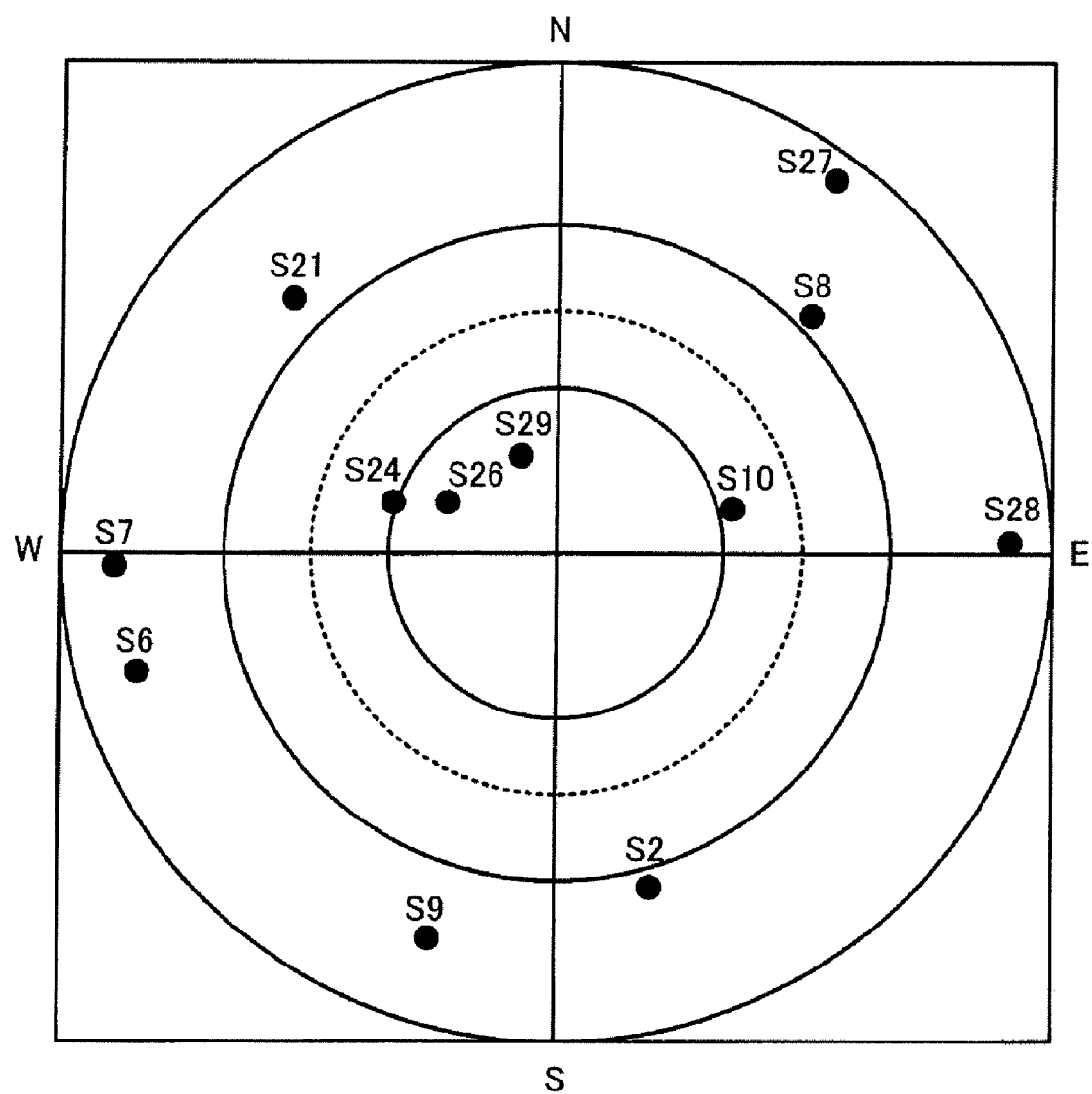
FIG. 19 is a view showing an example of the constellation of GPS satellites.

FIG. 20 is a view showing an example of experimental results obtained by performing the process according to this embodiment. FIG. 20 shows the results when the experiment was conducted under conditions where the constellation of the GPS satellites are as shown in FIG. 19. In FIG. 19, the circumference indicates an elevation angle of 0°, and the center of the circle indicates an elevation angle of 90° (i.e., the elevation angle of the GPS satellite increases from the circumference toward the center of the circle).

Among the twelve GPS satellites shown in FIG. 19, ten GPS satellites S2, S6, S7, S8, S9, S10, S21, S24, S26, and S29 could be acquired (step A1 in FIG. 16). A satellite combination including four or more acquired satellites was extracted from the ten acquired satellites (e.g., a satellite combination including six acquired satellites S7, S8, S9, S21, S24, and S29 was extracted) (step A3 in FIG. 16).

In this case, the elevation angles of the acquired satellites S7, S8, S9, S21, S24, and S29 were respectively 8°, 28°, 16°, 27°, 58°, and 72°, and the SNRs of the satellite signals received from the acquired satellites S7, S8, S9, S21, S24, and S29 were respectively 37.82, 33.00, 35.00, 37.07, 43.83, and 41.29.

Since the elevation angle of the acquired satellite S7 was equal to or less than 15° and the SNR of the acquired satellite S7 was equal to or less than 40 (step B7 in FIG. 18: Yes), the acquired satellite S7 was stored as the low-elevation-angle satellite data 375 (i.e., low-elevation-angle satellite) (step B9 in FIG. 18). Therefore, a satellite combination (acquired satellites S8, S9, S21, S24, and S29) obtained by excluding the acquired satellite S7 from the acquired satellites included in the satellite combination was generated as the sub-positioning satellite combination (step B13 in FIG. 18).

The horizontal distance between the master located position of the satellite combination and the sub-located position of the sub-positioning satellite combination was calculated and found to be 587.27 m (step A21 in FIG. 16). Specifically, since the horizontal distance was larger than the threshold distance (100 m) (step A23 in FIG. 16: Yes), the master located position of the satellite combination was determined to be inappropriate. The acquired satellite S7 (i.e., low-elevation-angle satellite) stored as the low-elevation-angle satellite data 375 was stored as the low-accuracy satellite data 376 (i.e., low-accuracy satellite) (step A27 in FIG. 16).

The following description is given taking an example in which the number of satellite combinations was six (A to F) for convenience of description. The satellite combination A including the acquired satellites S7, S8, S9, S21, S24, and S29 was deleted since the master located position was determined to be inappropriate (step A25 in FIG. 16). Since the satellite combinations B and C included the low-accuracy satellite S7, 30 point was subtracted from the evaluation point E (step A37 in FIG. 17).

The evaluation points E of the satellite combinations B to F were calculated and found to be −15.00, −18.00, 20.00, 21.00, and 23.00, respectively. Therefore, the satellite combination F having the highest evaluation point E was selected as the optimum combination (step A41 in FIG. 17). The master located position of the optimum combination F was determined to be the current positioning result position, and then output (step A43 in FIG. 17).

4. Effects

According to this embodiment, the satellite signals from the GPS satellites are searched to acquire the satellites, and positioning satellite combinations are extracted by combining the acquired satellites. The master positioning calculations using the satellite signals transmitted from the acquired satellites included in the satellite combination and the sub-positioning calculations using the satellite signals transmitted from the acquired satellites other than the low-elevation-angle satellite of which the elevation angle satisfies the given low elevation angle condition and the signal quality of the received satellite signal satisfies the given low quality condition are performed on each of the extracted satellite combinations. Whether or not the positioning result obtained using the satellite combination is appropriate is determined based on the difference between the master located position calculated by the master positioning calculations and the sub-located position calculated by the sub-positioning calculations. The positioning result position is determined from the positions calculated by the master positioning calculations on the satellite combinations and determined to be appropriate.

A low-elevation-angle satellite is likely to be affected by a multipath. When a low-elevation-angle satellite affected by a multipath exists, the accuracy of the sub-located position calculated by the sub-positioning calculations using the satellite signals transmitted from the acquired satellites other than the low-elevation-angle satellite is considered to be higher than that of the located position calculated by the master positioning calculations using the satellite signals transmitted from the acquired satellites including the low-elevation-angle satellite (i.e., closer to the actual position). Therefore, since it can be determined that the low-elevation-angle satellite is affected by a multipath when the difference between the master located position and the sub-located position is large, a located position with low positioning accuracy can be appropriately excluded by determining that the positioning result obtained using the satellite combination is inappropriate. A positioning result with high reliability can be obtained by determining the positioning result position from the remaining located positions.

5. Modification 5-1 Electronic Instrument

The invention may be applied to an arbitrary electronic instrument including a positioning device. For example, the invention may be applied to a notebook personal computer, a personal digital assistant (PDA), a car navigation system, and the like.

5-2 Satellite Positioning System

The above embodiments have been described taking the GPS as an example of the satellite positioning system. Note that the invention may also be applied to other satellite positioning systems such as the wide area augmentation system (WAAS), the Quasi Zenith Satellite System (QZSS), the Global Navigation Satellite System (GLONASS), and the GALILEO.

5-3 Process Split

The host CPU 50 may perform some or the entirety of the process performed by the CPU 33. For example, the host CPU 50 may perform the sub-positioning execution determination process, and the CPU 33 may determine the positioning result position based on the determination result.

5-4 Master Located Position Appropriateness Determination

The above embodiments have been described taking an example in which whether or not the master located position is appropriate is determined based on the horizontal distance between the master located position and the sub-located position. Note that whether or not the master located position is appropriate may be determined based on the actual distance or the difference in altitude between the master located position and the sub-located position. Specifically, when the actual distance between the master located position and the sub-located position is equal to or larger than a given threshold distance (e.g., 100 m), or the difference in altitude between the master located position and the sub-located position is equal to or larger than a given threshold altitude (e.g., 10 m), the master located position is determined to be inappropriate.

5-5 Deletion of Satellite Combination

The above embodiments have been described taking an example in which a point is subtracted from the evaluation point E when the low-accuracy satellite is included in the satellite combination. Note that the satellite combination that includes the low-accuracy satellite may be deleted. For example, in the experimental results shown in FIG. 20, the satellite combinations B and C that include the low-accuracy satellite S7 are deleted in addition to the satellite combination A.

5-6 Sub-Positioning Execution Determination Process

The above embodiments have been described taking an example in which whether or not the number of acquired satellites is equal to or larger than eight is determined in the step B1 of the sub-positioning execution determination process taking the open-sky environment into account. Note that this step may be omitted. The above embodiments have been described taking an example in which whether or not the number of acquired satellites of which the signal quality of the received satellite signal satisfies the high quality condition is equal to or larger than four is determined in the step B3. Note that this step may also be omitted. This is because whether or not the number of acquired satellites included in the sub-positioning satellite combination is equal to or larger than the number of positioning-enable satellites (four) is determined in the step B15.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning method that performs current position calculations and outputs a positioning result position, the positioning method comprising:
    searching for satellite signals transmitted from positioning satellites to acquire satellites;
    combining satellites among the acquired satellites to extract satellite sets used for positioning;
    performing first positioning calculations on each calculation-target satellite set among the extracted satellite sets using the satellite signals transmitted from the acquired satellites included in the calculation-target satellite set,
    performing second positioning calculations on each calculation-target satellite set among the extracted satellite sets using the satellite signals transmitted from the acquired satellites that are included in the calculation-target satellite set, but do not include a low-elevation-angle satellite, and determining whether or not a positioning result obtained using the calculation-target satellite set is appropriate based on the difference between a position calculated by the first positioning calculations and a position calculated by the second positioning calculations, the elevation angle of the low-elevation-angle satellite satisfying a given low elevation angle condition; and
    determining the positioning result position from the positions calculated by the first positioning calculations on the satellite sets for which the positioning result has been determined to be appropriate.

2. The positioning method as defined in claim 1, further comprising:
    determining the low-elevation-angle satellite included in the satellite set for which the positioning result has been determined to be inappropriate to be an inappropriate satellite;
    evaluating a position calculated by the first positioning calculations on each of the extracted satellite sets based on a given criteria; and
    lowering the evaluation corresponding to a satellite set that is included in the extracted satellite sets and includes the satellite determined to be the inappropriate satellite,
    the positioning result position being determined based on the evaluations corresponding to the extracted satellite sets.

3. The positioning method as defined in claim 1, further comprising:
    determining the low-elevation-angle satellite included in the satellite set for which the positioning result has been determined to be inappropriate to be an inappropriate satellite,
    the positioning result position being determined from the positions calculated by the first positioning calculations on the satellite sets for which the positioning result has been determined to be appropriate and which do not include the inappropriate satellite.

4. The positioning method as defined in claim 1,
    the second positioning calculations being performed using the satellite signals transmitted from the acquired satellites that are included in the calculation-target satellite set, but do not include an acquired satellite of which the elevation angle satisfies the given low elevation angle condition and a value that indicates the signal quality of the satellite signal received from that acquired satellite satisfies a given low quality condition.

5. A positioning method that performs current position calculations and outputs a positioning result position, the positioning method comprising:
    searching for satellite signals transmitted from positioning satellites to acquire satellites;
    combining satellites among the acquired satellites to extract satellite sets used for positioning;
    performing first positioning calculations on each calculation-target satellite set among the extracted satellite sets using the satellite signals transmitted from the acquired satellites included in the calculation-target satellite set, performing second positioning calculations on each calculation-target satellite set among the extracted satellite sets using the satellite signals transmitted from the acquired satellites that are included in the calculation-target satellite set, but do not include a low-elevation-angle satellite, and determining whether or not a positioning result obtained using the calculation-target satellite set is appropriate based on the difference between a position calculated by the first positioning calculations and a position calculated by the second positioning calculations, the elevation angle of the low-elevation-angle satellite satisfying a given low elevation angle condition;

determining the low-elevation-angle satellite included in the satellite set for which the positioning result has been determined to be inappropriate to be an inappropriate satellite;

evaluating a position calculated by the first positioning calculations on each of the extracted satellite sets based on a given criteria;

lowering the evaluation corresponding to a satellite set that is included in the extracted satellite sets and includes the satellite determined to be the inappropriate satellite; and determining the positioning result position from the positions calculated by the first positioning calculations on the extracted satellite sets based on the evaluations corresponding to the extracted satellite sets.

6. A positioning device that performs current position calculations and outputs a positioning result position, the positioning device comprising:

a satellite acquisition section that searches for satellite signals transmitted from positioning satellites to acquire satellites;

a satellite set extraction section that combines satellites among the acquired satellites to extract satellite sets used for positioning;

a positioning calculation section that performs first positioning calculations on each calculation-target satellite set among the extracted satellite sets using the satellite signals transmitted from the acquired satellites included in the calculation-target satellite set, performs second positioning calculations on each calculation-target satellite set among the extracted satellite sets using the satellite signals transmitted from the acquired satellites that are included in the calculation-target satellite set, but do not include a low-elevation-angle satellite, and determines whether or not a positioning result obtained using the calculation-target satellite set is appropriate based on the difference between a position calculated by the first positioning calculations and a position calculated by the second positioning calculations, the elevation angle of the low-elevation-angle satellite satisfying a given low elevation angle condition; and a positioning result position determination section that determines the positioning result position from the positions calculated by the first positioning calculations on the satellite sets for which the positioning result has been determined to be appropriate.

7. An electronic instrument comprising the positioning device as defined in claim 6.

* * * * *